(12) United States Patent  (10) Patent No.: US 8,984,659 B2
Havercan  (45) Date of Patent: *Mar. 17, 2015

(54) DUAL TRUST ARCHITECTURE

(71) Applicant: International Business Machines Corporation, Armonk, NY (US)

(72) Inventor: Peter E. Havercan, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/779,901

(22) Filed: Feb. 28, 2013

(65) Prior Publication Data

US 2013/0179994 A1 Jul. 11, 2013

Related U.S. Application Data

(63) Continuation of application No. 13/419,608, filed on Mar. 14, 2012, now Pat. No. 8,495,754.

(30) Foreign Application Priority Data

Mar. 28, 2011 (EP) .................................. 11160018

(51) Int. Cl.
G06F 21/00 (2013.01)
G06F 21/12 (2013.01)
G06F 21/14 (2013.01)

(52) U.S. Cl.
CPC ................ *G06F 21/12* (2013.01); *G06F 21/14* (2013.01)
USPC .......................................................... 726/30

(58) Field of Classification Search
None
See application file for complete search history.

(56) References Cited

U.S. PATENT DOCUMENTS

| | | | |
|---|---|---|---|
| 5,745,676 | A | 4/1998 | Hobson |
| 2005/0097151 | A1 | 5/2005 | Sayed |
| 2005/0097252 | A1 | 5/2005 | Kelley et al. |
| 2012/0017285 | A1 | 1/2012 | Piwonka et al. |
| 2012/0036341 | A1 | 2/2012 | Morfey et al. |
| 2012/0255038 | A1 | 10/2012 | Havercan |

FOREIGN PATENT DOCUMENTS

| | | |
|---|---|---|
| JP | 2011070290 A | 4/2011 |
| WO | WO 2010/004240 A1 | 1/2010 |

OTHER PUBLICATIONS

Notice of Allowance mailed Apr. 1, 2013 for U.S. Appl. No. 13/419,608; 10 pages.

(Continued)

*Primary Examiner* — Benjamin Lanier
(74) *Attorney, Agent, or Firm* — Stephen J. Walder, Jr.; Jeffrey S. LaBaw (57) ABSTRACT

Mechanisms for executing a software routine in an application executing as a multi-user single address space subsystem in an operating environment having a trusted mode of operation for trusted routines and a reduced-trust mode of operation for untrusted routines. The application includes a control module for execution as a trusted routine and a trusted routine table including identifiers of trusted routines. The control module performs switches between a trusted mode of operation for execution and a reduced trust mode of operation based on various determinations regarding the nature of a calling routine being trusted or untrusted, a call stack, and whether the calling routine is being restored or not from the call stack.

13 Claims, 3 Drawing Sheets

(56) References Cited

OTHER PUBLICATIONS

Office Action mailed Mar. 5, 2013 for U.S. Appl. No. 13/419,608; 11 pages.
Preliminary Amendment filed with the USPTO on Feb. 28, 2013 for U.S. Appl. No. 13/419,608; 5 pages.
Combined Search and Examination Report under Sections 17 and 18(3) dated Jul. 9, 2012 for Application No. GB1205279.1, 5 pages.
Response to Examination Report under Section 18(3) filed Oct. 15, 2012 for Application No. GB1205279.1, 2 pages.
U.S. Appl. No. 13/419,608.
"z/Architecture Principles of Operation", IBM Publication No. SA22-7832-08, Ninth Edition, IBM Corporation, http://dc377.4shared.com/doc/vyMztib0/preview.html, Aug. 2010, 31 pages.

DUAL TRUST ARCHITECTURE

BACKGROUND

The present invention relates to a dual trust architecture. In particular, the present invention relates to an architecture for executing trusted and untrusted routines in a call stack.

In a multiuser single address space subsystem, such as IBM's CICS (CICS is a Registered Trademark of IBM Corporation), multiple threads are executed on behalf of different users within the same address space. The individual threads are usually represented by call stacks, also known as register save areas, where a state of a software routine is saved while execution passes to another routine, and restored on return. The state preserved on the stack includes the contents of processor registers and may also contain other processor state.

In such subsystems the contents of the stack may be open to modification by threads other than a current thread so that, when the contents of a stack element are restored, the restored state can cause accidental or malicious modifications to important system status. Such modifications can affect, inter alia: the address of the next instruction to be executed; the addresses of subroutines to be executed later; the base address(es) of a calling routine; tokens or addresses representing the identity of the user currently executing the thread.

With such modifications to the stack, the targeted thread can be made to execute an unintended function with unintended data under an unintended identity, leading to integrity and security violations such as Information Disclosure, Denial of Service, and Elevation of Privilege.

The IBM z/OS operating system (z/OS is a Registered Trademark of IBM Corporation) provides a secure stack, more usually identified as the Request Block chain. When operating system services are used to link between programs (for instance by using supervisor calls (SVCs), or the operating system LINK or SYNCH services) the calling program's state is saved in a secure storage area, the Request Block, where it cannot be manipulated by application code. The Request Blocks are protected by a protection mechanism called the Key-Controlled Protection mechanism of z/Architecture (z/Architecture is a Registered Trademark of IBM Corporation). Details regarding the z/Architecture are described in an IBM publication entitled "z/Architecture Principles of Operation," IBM Publication Number SA22-7832-08.

Due to the involvement of operating system services, the Request Block chain mechanism described above is resource expensive, and its use will be necessarily limited in environments where high performance is required.

U.S. Pat. No. 5,745,676 describes a Branch and Set Authority instruction (BSA) of an operating environment that, when executed in a base-authority state, saves a return address and base authority in a secure data area and sets a reduced-authority state. When executed in the reduced-authority state, the BSA instruction branches to the saved return address, restores the saved base authority, and sets the base-authority state.

It would therefore be advantageous to provide a mechanism for protecting resources created and used by trusted software routines from access and modification by untrusted software routines executing within a multiuser single address space subsystem.

SUMMARY

The present invention accordingly provides, in a first aspect, a method for executing a software routine in an application, the application executing as a multi-user single address space subsystem in an operating environment having a trusted mode of operation for trusted routines and a reduced-trust mode of operation for untrusted routines. The application includes a control module for execution as a trusted routine and a trusted routine table including identifiers of trusted routines. The method comprises, in response to a determination that the routine is restored from a call stack and the routine is a most recent entry in an active trusted routine list, the control module switching to the trusted mode of operation for execution of the routine and removing the routine from the active trusted routine list. The method further comprises, in response to a determination that the routine is not restored from a call stack and that the routine is included in the trusted routine table, the control module switching to the trusted mode of operation for execution of the routine. The method also comprises, in response to a determination that the routine is untrusted, the control module switching to the reduced-trust mode of operation for execution of the routine. Moreover, the method comprises, in response to a determination that the routine is not restored from a call stack and that a calling routine for the routine is executing in a trusted operating mode, the control module adding the calling routine to the active trusted routine list. In the trusted mode of operation the application records or modifies trusted data that is not modifiable in the reduced-trust mode of operation.

The trusted and reduced-trust modes of operation may be enforced in the operating environment by a cooperation of an operating system and processor hardware of the operating environment. The operating environment may be a z/Architecture environment. The trusted and reduced-trust modes of operation may be implemented as a key-controlled protection mechanism of the z/Architecture environment. The switching operation may be performed using a Branch and Set Authority (BSA) instruction of the z/Architecture environment.

Thus, in one illustrative embodiment, the invention provides for the application to accommodate changes between the trusted and reduced trust modes of operation by way of the trusted control module. The trusted control module, in conjunction with the trusted routine table and the active trusted routine list, may be operable to identify authorized transitions of execution to trusted routines from untrusted routines and switch operating mode accordingly. Further, the trusted control module may be operable to safely transition execution from a trusted operating mode to a reduced-trust operating mode. Since the transitions are undertaken by the control module of the application itself, without relying on system services, such as operating system services, the resource overhead of the transitions is relatively low. The resource overhead can be low enough to provide for multiple switches between operating modes within the same thread, such that different routines in the call stack may be executing in the trusted and reduced-trust operating modes.

The present invention, in accordance with one illustrative embodiment, provides, in a second aspect, an apparatus for executing a software routine in an application, the application executing as a multi-user single address space subsystem in an operating environment having a trusted mode of operation for trusted routines and a reduced-trust mode of operation for untrusted routines. The application may include a control module for execution as a trusted routine and a trusted routine table including identifiers of trusted routines. The apparatus comprises a control module for, in response to a determination that the routine is restored from a call stack and the routine is a most recent entry in an active trusted routine list, switching to the trusted mode of operation for execution of the routine and removing the routine from the active trusted routine list. The control module is further operable to, in response to a determination that the routine is not restored from a call stack and that the routine is included in the trusted routine table, switch to the trusted mode of operation for execution of the routine. The control module is further operable to, in response to a determination that the routine is untrusted, switch to the reduced-trust mode of operation for execution of the routine. The control module is further operable to, in further response to a determination that the routine is not restored from a call stack and that a calling routine for the routine is executing in a trusted operating mode, adding the calling routine to the active trusted routine list. In the trusted mode of operation, the application records or modifies trusted data that is not modifiable in the reduced-trust mode of operation.

The present invention, in another illustrative embodiment, provides, in a third aspect, an apparatus comprising: a central processing unit; a memory subsystem; an input/output subsystem; and a bus subsystem interconnecting the central processing unit, the memory subsystem, the input/output subsystem; and the apparatus as described above. The present invention, in another illustrative embodiment, provides, in a fourth aspect, a computer program element comprising computer program code to, when loaded into a computer system and executed thereon, cause the computer to perform the steps of a method as described above.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
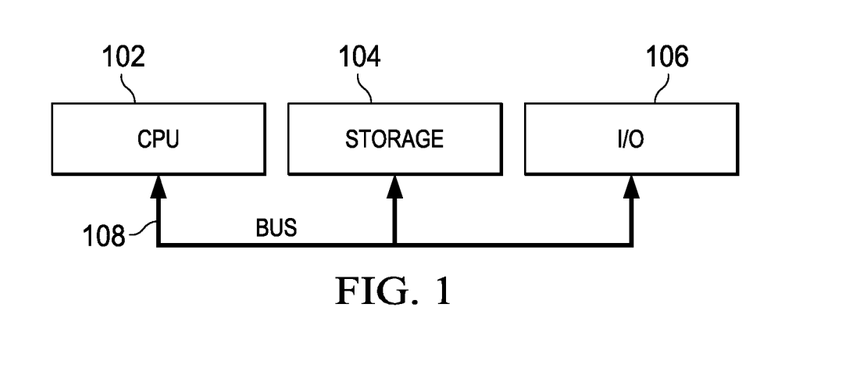
FIG. 1 is an example block diagram of a computer system suitable for the operation of embodiments of the present invention.

FIG. 1 is an example block diagram of a computer system suitable for the operation of embodiments of the present invention. A central processor unit (CPU) 102 is communicatively connected to a storage device 104 and an input/output (I/O) interface 106 via a data bus 108. The storage device 104 can be any read/write storage device such as a random access memory (RAM), a non-volatile storage device, or the like. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
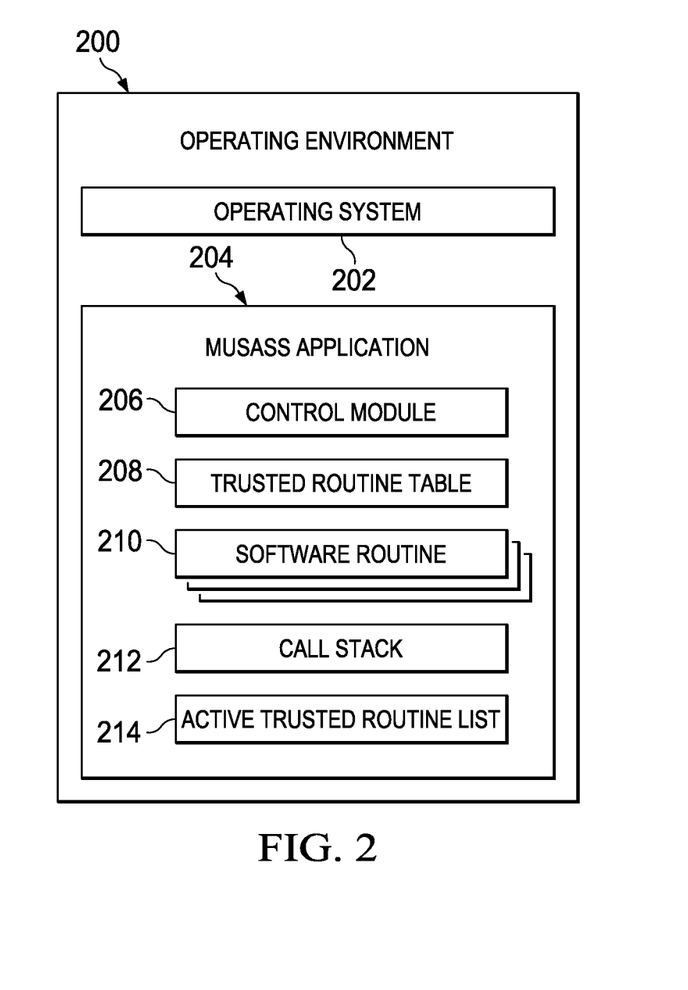
FIG. 2 is an example block diagram of an operating environment in accordance with one illustrative embodiment of the present invention.

FIG. 2 is an example block diagram of an operating environment 200 in accordance with one illustrative embodiment of the present invention. The operating environment 200 of FIG. 2 is a computing environment comprised of a combination of hardware and software. The hardware may be provided as a computer system such as is most generically illustrated in FIG. 1 and described above, with which software, such as operating system software and applications, execute.

The operating environment 200 is suitable for operating in multiple modes of operation to provide system security and reliability. Specifically, the operating environment 200 is able to operate in a trusted mode of operation, in which trusted software instructions are executed such that the instructions can access, and potentially modify, programs and data stored in a protected manner in a data store for the operating environment 200. Further, the operating environment 200 is able to operate in a reduced-trust mode of operation, in which untrusted software instructions are executed such that the instructions may not be able to access, and will not be able to modify, programs and data stored in a protected manner in the data store.

For example, the operating environment may be a z/Architecture environment executing z/OS operating system and including the Key-Controlled Protection mechanism detailed in IBM publication "z/Architecture Principles of Operation," IBM Publication Number SA22-7832-08. With Key-Controlled Protection, a four-bit access key is stored in a program status word that encapsulates the basic execution state of a routine at any instant. The access key is compared with access-control bits of a storage key of each block in a memory storage. Only permitted keys are able to access the memory storage, otherwise access is forbidden. Thus, the state of the access key in the program status word defines a current operating mode of the operating environment 200. Specifically, in the z/Architecture, the four-bit access key defines sixteen possible keys ranging from 0 to 15 of which key 0 is the most privileged and is used by the operating system. Keys 1 to 7 are generally reserved for trusted instructions including operating system services and trusted subsystem routines, and keys 8 and above are used by user level applications. Commonly, key 8 is a normal user key and instructions executing in key 8 can be considered to be generally untrusted.

The operating environment 200 includes an operating system 200 such as z/OS or any other suitable operating system. Further, the operating environment 200 includes a multi-user single address space subsystem (MUSASS) 204 executing as an application in the operating environment. While expressed as an application 204, it will be apparent to those skilled in the art that the MUSASS application 204 can provide an operating environment in its own right within which specific application services, routines, and programs may execute. In this regard, the MUSASS 204 can provide application services including, inter alia, memory management, system control, resource control and sharing, communication services, protocol services. An example of MUSASS application 204 is IBM's Customer Information Control System (CICS), a registered trademark of IBM Corporation.

The application 204 includes software routines 210 as executable components including instructions for execution by a processor of the operating environment 200. In execution, each of the software routines 210 can call, branch, link to, jump to, or execute other software routines. The mechanism for transferring control between routines executing in application 204 is managed using a call stack 212 or other suitable data structure. Call stack 212, also commonly known as a register save area, is a data structure for the storage of software routine state information for use when a calling software routine invokes a called software routine. The state preserved in the call stack 212 includes the contents of processor registers and may also contain other processor state.

In accordance with one illustrative embodiment of the present invention, the application 204 further includes a trusted routine table 208 which indicates software routines 210 which are suitable for execution in a trusted mode of operation of the computing environment 200. Modification of the trusted routine table 208 is therefore to be restricted to routines suitable for execution in the trusted mode of operation or operating system routines. The trusted routine table 208 may be implemented as a table data structure or any other data structure suitable for the storage of one or more routine identifiers to indicate such routines as trusted. Further, application 204 includes an active trusted routine list 214 as an ordered data structure including an identifier of, or reference to, currently executing software routines in the call stack 212 that are executing in the trusted mode of operation. The active trusted routine list 214 is ordered by the order of execution of the trusted software routines. A most recently executed trusted software routine will therefore be discernable from the active trusted routine list 214. Preferably, the active trusted routine list 214 is implemented as a list or chain data structure such as a linked list, with entries in the list being also entries in the call stack 212. Thus, in this way, the active trusted routine list 214 provides a list or chain of trusted stack entries from the call stack 212. Modification of the active trusted routine list 214 is therefore to be restricted to routines suitable for execution in the trusted mode of operation or operating system routines.

In accordance with the present invention, the application 204 further includes a control module 206 as a software routine for execution in a trusted mode of operation of the operating environment 200 for switching the mode of operation of the operating environment between a trusted mode and a reduced-trust mode of operation. In one illustrative embodiment, the control module 206 employs a special instruction for switching the operating mode of the operating environment 200. For example, in the z/Architecture, the control module can employ the Branch and Set Authority (BSA) instruction described in U.S. Pat. No. 5,745,676 for switching a processor mode between a base-authority state (a trusted mode of operation) and a reduced-authority state (a reduced-trust mode of operation). In the Key-Controlled Protection mechanism of the z/Architecture, the BSA instruction is also operable to switch between more trusted keys such as key 7, and generally untrusted keys such as key 8.

In use, the control module 206 in conjunction with the call stack 212, the trusted routine table 208 and the active trusted routine list 214 to switch between the trusted mode and a reduced-trust mode of operation in accordance with the methodology of FIG. 3, or the like, described below.

Figure 3:
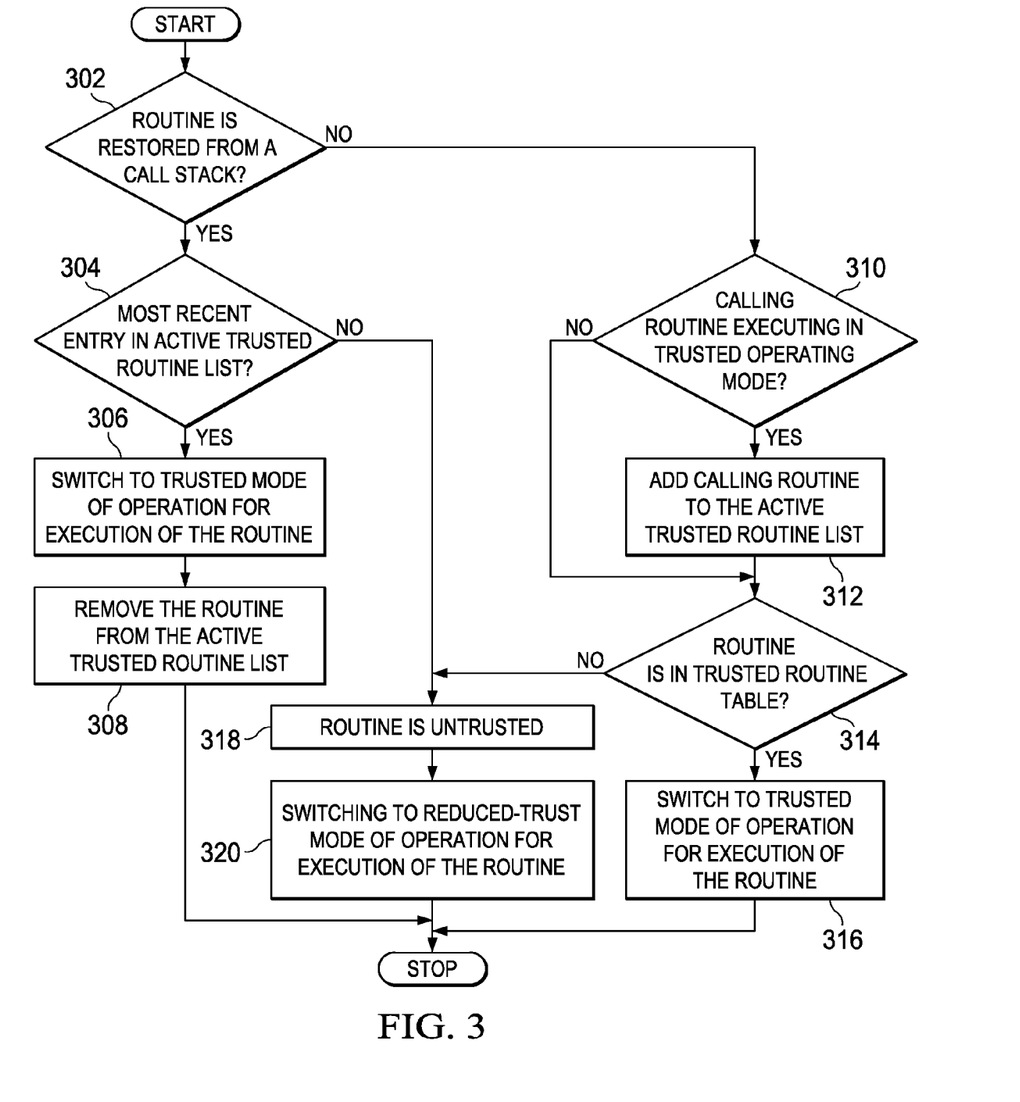
FIG. 3 is an example flowchart of an example method for executing a software routine in an application executing as a multi-user single address space subsystem in accordance with one illustrative embodiment of the present invention.

FIG. 3 is an example flowchart of an example method for executing a software routine 210 in an application executing as a multi-user single address space subsystem 204 in accordance with one illustrative embodiment of the present invention. The execution of the software routine 210 can result from a software routine call, link, branch or jump from another software routine. Alternatively, the execution may be a continuation of execution previously suspended as part of a call, link, branch, or jump operation. Thus, the execution may arise from a return from such a call, link, branch, or jump. The method is used to generally determine a need to switch operating mode of the operating environment 200 and to achieve such switch by way of the control module 206. It will be appreciated by those skilled in the art that the order of the steps, specifically the order of the determination steps, is not definitive and any appropriate order will suffice.

Initially, at step 302, the method determines if the routine for execution is being restored from the call stack 212. A positive determination at step 302 indicates that the routine is continuing execution having been suspended as part of a call to another routine, and is therefore a return from a call. On such positive determination, the method determines if the routine is a most recent routine in the active trusted routine list 304. A positive determination at step 304 indicates that the routine to which execution is returning is a trusted routine because it is represented as the most recent active trusted routine. Accordingly, at step 306, the control module 206 transitions the operating mode of the operating environment 200 to a trusted mode of execution for the routine. Further, at step 308, the routine is removed from the active trusted routine list 214. A negative determination at step 304 implies the routine is an untrusted routine and the method proceeds to step 316. It is implicit, as part of a return operation, that the routine will also be removed (or popped) from the call stack 212. Indeed, that removal can form the basis for the determination at step 302.

A negative determination at step 302 indicates that the routine is executing as a result of a call, branch, jump, or link, as opposed to a return operation. Such operations occur from another routine such as a calling routine. A calling routine is a routine from which a call, branch, jump, or link operation occurs. At step 310, the method determines if the calling routine is executing in a trusted operating mode of the operating environment 200. If so, the method adds the calling routine to the active trusted routine list 214 at step 312. In this way, the ordered list 214 of active trusted routines is kept up to date with the most recent trusted routine in the call stack 212, and the list 214 includes all trusted routines in the call stack 212.

At step 314, the method determines if the routine is indicated in the trusted routine table 208. The trusted routine table 208 includes a reliable trusted indication for all software routines 210 that are trusted to execute in the trusted operating mode. A positive determination at step 314 leads to the control module 206 transitioning the operating mode of the operating environment 200 to a trusted mode of execution for the routine at step 316. A negative determination at step 314 indicates that the routine is untrusted and should execute in a reduced-trust mode of operation. Accordingly, at step 320 the control module 206 switches the mode of operation of the operating environment to a reduced-trust mode for the execution of the routine.

Thus, in use, in at least one illustrative embodiment, the present invention provides for the application 204 to accommodate changes between the trusted and reduced-trust modes of operation by way of the trusted control module 206. The trusted control module 206, in conjunction with the trusted routine table 208 and the active trusted routine list 214, is operable to identify authorized transitions of execution to trusted routines from untrusted routines and switch operating mode accordingly. Further, the trusted control module 206 is operable to safely transition execution from a trusted operating mode to a reduced-trust operating mode. Since the transitions are undertaken by the control module 206 of the application 204 itself, without relying on system services such as operating system 202 services, the resource overhead of the transitions is relatively low. The resource overhead can be low enough to provide for multiple switches between operating modes within the same thread, such that different routines in the call stack 212 may be executing in the trusted and reduced-trust operating modes. In this case, the active trusted routine list 214 provides a list or chain of trusted stack entries from the call stack 212 in a secure and reliable manner.

Figure 4:
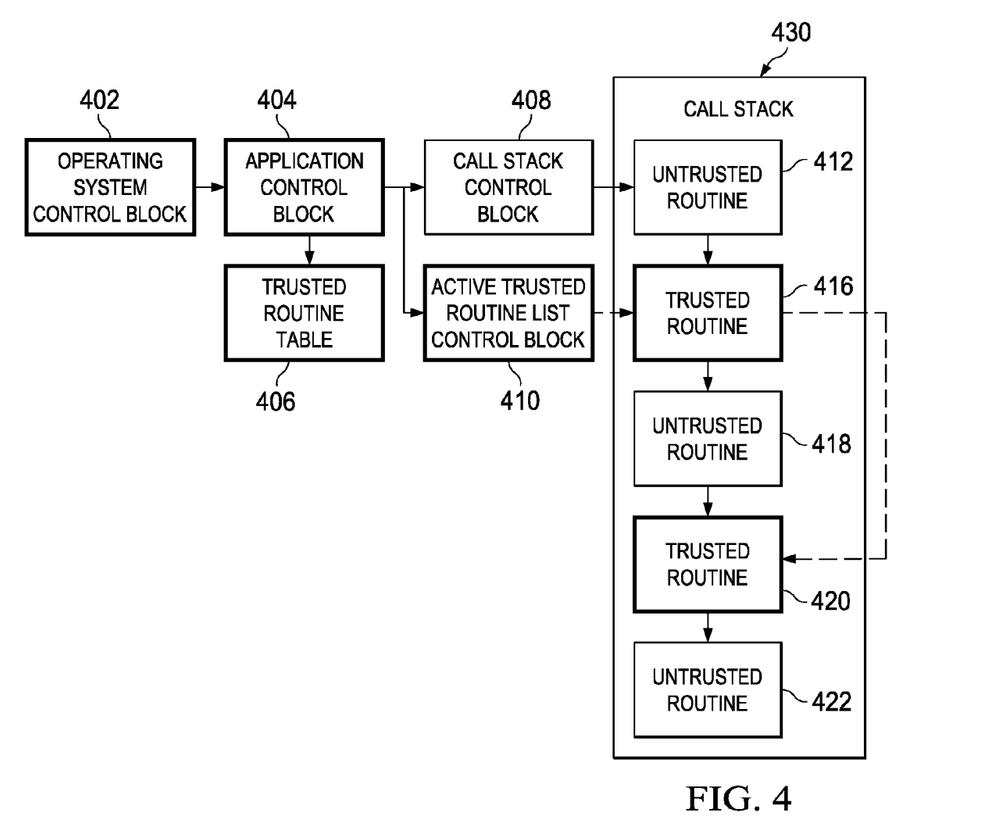
FIG. 4 is an example block diagram of a data arrangement in an operating environment of a computer system in accordance with an illustrative embodiment of the present invention.

FIG. 4 is an example block diagram of a data arrangement in an operating environment of a computer system in accordance with one illustrative embodiment of the present invention. The arrangement of FIG. 4 is indicative of how control information and routine stack data may be stored in accordance with the method of FIG. 3 in use. Each block of FIG. 4 is a data item element stored in a memory of the operating environment 200. Blocks having boldest lines indicate that elements are reliable trusted elements modifiable (and potentially accessible) only by trusted routines in the operating environment 200. Blocks having faint lines indicate that elements are modifiable and accessible by both trusted and untrusted software routines. Such access control can be achieved by way of, for example, the Key-Controlled Protection mechanism of the z/Architecture.

Block 402 indicates an operating system control block 402 being stored in accordance with a trusted mechanism, such as a key 0 element in the Key-Controlled Protection mechanism. Application control block 404 is also trusted, such as by way of a key 7 trusted element Key-Controlled Protection mechanism. The application control block 404 refers to control blocks for use by a MUSASS application, including one or more of: a trusted routine table 406 as described with respect to FIG. 2; an Active Trusted Routine List Control Block 410 corresponding to the active trusted routine list 214 described above with respect to FIG. 2; and a call stack control block 408 indicating a call stack 430 corresponding to the call stack 212 of FIG. 2. The call stack control block 408 is accessible to routines executing in a reduced-trust mode of operation.

In use, the call stack 430 includes entries corresponding to software routines executing in a thread of execution in the operating environment 200. The control module 206 in embodiments of the present invention provide for the transition of an operating mode of the operating environment between trusted and reduced-trust modes. The transition may take place, for example, in accordance with FIG. 3 on execution of a software routine. The execution can occur as a result of, for example, a new call, branch, jump, or link operation, or a return from such an operation. Accordingly, the call stack 430 of the software routine can include a mix of both untrusted routines 412, 418, 422 and trusted routines 416, 420. The active trusted routine list control block 410 maintains a list of the routines in the call stack 430 that are executing in a trusted mode of operation such that the control module can verify and switch the operating mode appropriately during return operations. Further, the trusted routine table 406 may include a list of software routines eligible for execution in the trusted operating mode such that the control module 206 can verify and switch the operating mode appropriately during call, jump, link, or branch operations.

Thus, illustrative embodiments of the present invention provide a potentially mixed stack of trusted and untrusted software routines with transitions between operating modes being undertaken efficiently and rigorously without the overhead of referring to or employing high-overhead system services such as those offered by the operating system.

An illustrative embodiment of the present invention implemented in the z/Architecture environment will now be described. It will be appreciated that the specific implementation considerations of this embodiment do not represent the only implementation option, and alternatives will be possible. In accordance with this illustrative embodiment of the present invention, the software stack is allocated with elements in two different storage keys. The two types of stack element are called trusted and untrusted. The trusted elements can be allocated with a storage protection key of 7, and the untrusted elements can be allocated with a storage protection key of 8.

In one illustrative embodiment each routine in the call stack 212 may have a backward pointer to its immediate predecessor, regardless of the trust status of the predecessor. The immediate predecessor is the routine in the call stack 212 owned by the calling routine in a sequence of calls. The backward stack pointer is the same as a backward "savearea" pointer that is used in classical savearea chain management. In principle, when a called routine returns control to its caller, it locates the previous savearea though the backward pointer, restores the registers from that savearea, and returns to the address in the nominated linkage register that has thereby been restored.

In accordance with the illustrative embodiment of the present invention, in addition to the normal savearea backward pointer described above, the trusted (key 7) stack elements may also be linked together in a different chain—a trusted savearea chain or active trusted routine list 214. An identifier, such as an address, of a most recently used trusted routine may be kept in a task-related global location that is also protected (in key 7) so that it cannot be altered by untrusted routines, such as the active trusted routine list control block 410.

In one illustrative embodiment, the application may have a call handling service for handling calls, jumps, links, or branches between routines, and that this service can identify the characteristics of a called routine (such as in the CICS domain architecture). The call handling service may identify each called routine as either trusted or untrusted. The call handling service may also maintain pools of unused stack elements, both trusted and untrusted. When the call handling service identifies a call to an untrusted routine, it allocates a stack element from the untrusted pool, and when it identifies a call to a trusted routine, it allocates a stack element form the trusted pool. Such a call handling service can be implemented in the functions of the control module 206.

In one illustrative embodiment a Key-Controlled Protection mechanism is employed and switching between the trusted and reduced-trust modes of operation, for trusted and untrusted routines, includes switching keys in the protection mechanism. As well as allocating the trusted and untrusted stack elements in the call stack 212, the control module 206 may also handle the switching of the key which can be stored in the a Program Status Word (PSW) of a processor in the operating environment 200. To achieve this with high performance, the Branch and Set Authority (BSA) instruction (described in U.S. Pat. No. 5,745,676) may be used, for example. The BSA instruction switches the processor mode between a base-authority state (trusted) and a reduced-authority state (reduced-trust). The control module 206 runs in base-authority (trusted) state and, for example, in key 7. All untrusted programs run in reduced-authority state and, for example, in key 8. In this architecture, an untrusted routine (in key 8) will not return to base-authority state (and key 7) without also returning control to the control module 206. This can be guaranteed by the BSA hardware architecture. Furthermore, an untrusted routine cannot manipulate the contents of a trusted routine's stack elements because they are protected by z/Architecture Key-Controlled Protection.

The BSA instruction comes in two types: "BSA call" (BSA-ba), which calls a routine in reduced-authority (reduced-trust) state; and "BSA return" (a.k.a. BSA-ra) which returns control from the reduced-authority routine and restores the base-authority (trusted) state. The BSA-ra instruction always returns control to the instruction immediately following the BSA-ba instruction. The reduced-authority routine has no control over this.

When a trusted routine calls an untrusted routine, the operating mode must be switched from base-authority (trusted) to reduced-authority (untrusted). In one illustrative embodiment, this is done by issuing a "BSA call" (BSA-ba) instruction, which switches the key from 7 to 8, only allows key switches between keys 8 and 9 (untrusted), and sets reduced-authority (reduced-trust) before branching to the called routine.

When an untrusted routine needs to return control to a trusted routine, the operating mode must also be returned from reduced-authority (reduced-trust) state to base-authority (trusted) state. The control module 206 detects this by noting that the stack element being restored is the same as the "last trusted stack element" that had been saved earlier to the active trusted routine list 214. In one illustrative embodiment, in this situation, the control module 206 returns to base-authority (and key 7) (trusted) state by issuing a "BSA return" (BSA-ra) instruction. Also, a "last trusted stack element" indicator in the active trusted routine list 214 is replaced with the address of the next trusted stack element on the trusted chain. For complete integrity, the trusted routine that thereby receives control should not rely on any of the register contents from the returning, untrusted, routine. It should only rely on the content of the trusted stack element and the contents of any other control blocks that are protected from alteration by untrusted routines.

When an untrusted routine is executing, the operating environment 200 is in reduced-authority (reduced-trust) state. Thus, if the untrusted routine wishes to call a trusted routine, the untrusted routine must first return control to the control module 206 using a "BSA return" (BSA-ra) instruction, which can then call the trusted routine in key 7 and base-authority (trusted) state. In response to the untrusted routine doing so, the control module 206 adds the new trusted routine as the "last trusted stack element" in the active trusted routine list 214.

When a trusted routine needs to return control to an untrusted routine, the operating mode must also be switched from base-authority (trusted) to reduced-authority (untrusted). The control module 206 removes the current stack element from the "last trusted stack element" chain (active trusted routine list 214) and issues a "BSA call" (BSA-ba) to invoke the untrusted routine.

When a trusted routine calls an untrusted routine, or vice versa, a parameter list passed by the calling routine is generally in a different key-protection key from that expected by the called program. As a convenience to the routines on both sides of the call, the control module 206 may undertake to copy the parameter list from the protection key of the calling routine to that of the called routine. This is most readily achieved by extending the size of the stack element being allocated for the called routine (which is in the correct key for the called routine), and then copying the parameter list into that extension with one of the "move with key" instructions ("move with source key" or "move with destination key"), depending on the direction of the movement. If the called routine returns output parameters to the caller, the parameter list may be copied back to the caller's key on return as well.

Embodiments of the present invention enable a MUSASS application to protect its own resources from interference by the application routines that the subsystem is controlling without significantly affecting the normal operation of the applications. The subsystem can then conveniently save its important system data into its stack elements without the possibility of it being accidentally or maliciously modified by application programs. Such data can include, for example: addresses of important system routines (such as the control module 206 itself, and subsystem service routines); entry and return addresses within the subsystem service routines; local variables within the subsystem service routines; user credentials; indicators representing security options for the managed application tasks; and the like.

Illustrative embodiments of the present invention may also provide for the application 204 to implement completely private data that is inaccessible to certain routines by using storage areas in a trusted subsystem key (e.g. key 7 in the Key-Controlled Protection mechanism) and that are also fetch protected.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method, in a data processing system having a processor and a memory, for executing a software routine in an application, the application executing as a multi-user single address space subsystem in an operating environment having a trusted mode of operation for trusted routines and a reduced-trust mode of operation for untrusted routines, the application including a control module for execution as a trusted routine and a trusted routine table including identifiers of trusted routines, the method comprising the following operations executed by the data processing system:

switching, by the control module, in response to a determination that the routine is restored from a call stack and the routine is a most recent entry in an active trusted routine list, to the trusted mode of operation for execution of the routine, and removing, by the control module, the routine from the active trusted routine list;

switching, by the control module, in response to a determination that the routine is not restored from a call stack and that the routine is included in the trusted routine table, to the trusted mode of operation for execution of the routine;

switching, by the control module, in response to a determination that the routine is untrusted, to the reduced-trust mode of operation for execution of the routine; and adding, by the control module, in response to a determination that the routine is not restored from a call stack and that a calling routine for the routine is executing in a trusted operating mode, the calling routine to the active trusted routine list, wherein in the trusted mode of operation the application records or modifies trusted data that is not modifiable in the reduced-trust mode of operation.

2. The method of claim 1, wherein the trusted and reduced-trust modes of operation are enforced in the operating environment by a cooperation of an operating system and processor hardware of the operating environment.

3. The method of claim 2, wherein the operating environment is a z/Architecture environment.

4. The method of claim 3, wherein the trusted and reduced-trust modes of operation are implemented as a key-controlled protection mechanism of the z/Architecture environment.

5. The method of claim 4, wherein the switching operations are performed using a Branch and Set Authority (BSA) instruction of the z/Architecture environment.

6. A method, in a data processing system having a processor and a memory, for executing a software routine in an application having a trusted mode of operation for trusted routines and a reduced-trust mode of operation for untrusted routines, comprising:

switching, by the processor, based on results of one or more determinations as to whether the software routine is restored from a call stack and is or is not in a trusted routine table, the application to one of a trusted mode of operation for execution of the software routine or to the reduced-trust mode of operation for execution of the software routine resulting in a switched mode of operation; and executing, by the processor, the software routine in the switched mode of operation, wherein, in the trusted mode of operation, the application records or modifies trusted data that is not modifiable in the reduced-trust mode of operation.

7. The method of claim 6, wherein switching the application to one of a trusted mode of operation or the reduced-trust mode of operation, further comprises at least one of:

switching, in response to a determination that the routine is restored from a call stack and the routine is a most recent entry in an active trusted routine list, to the trusted mode of operation for execution of the routine, and removing the routine from the active trusted routine list;

switching, in response to a determination that the routine is not restored from a call stack and that the routine is included in the trusted routine table, to the trusted mode of operation for execution of the routine; or switching, in response to a determination that the routine is untrusted, to the reduced-trust mode of operation for execution of the routine.

8. The method of claim 7, further comprising:

adding, by the processor, in response to a determination that the routine is not restored from a call stack and that a calling routine for the routine is executing in a trusted operating mode, the calling routine to the active trusted routine list.

9. The method of claim 6, wherein the trusted and reduced-trust modes of operation are enforced in the operating environment by a cooperation of an operating system and processor hardware of the operating environment.

10. The method of claim 6, wherein the trusted and reduced-trust modes of operation are implemented as a key-controlled protection mechanism of the z/Architecture environment.

11. The method of claim 6, wherein the switching operation is performed using a Branch and Set Authority (BSA) instruction of the z/Architecture environment.

12. The method of claim 6, wherein the application executes as a multi-user single address space subsystem in an operating environment.

13. The method of claim 12, wherein the operating environment is a z/Architecture environment.

* * * * *